(12) United States Patent
Kumaran et al.

(10) Patent No.: US 6,775,233 B1
(45) Date of Patent: Aug. 10, 2004

(54) RATE PROCESSOR SHARING METHOD AND APPARATUS FOR SCHEDULING DATA TRANSMISSIONS IN A CDMA WIRELESS COMMUNICATION SYSTEM

(75) Inventors: Krishnan Kumaran, Scotch Plains, NJ (US); Philip Alfred Whiting, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 845 days.

(21) Appl. No.: 09/598,541

(22) Filed: Jun. 21, 2000

Related U.S. Application Data

(60) Provisional application No. 60/151,541, filed on Aug. 31, 1999.

(51) Int. Cl.[7] .......................... H04J 13/00; H04L 12/26
(52) U.S. Cl. ............................. 370/230.1; 370/395.21
(58) Field of Search .......................... 370/230, 230.1, 370/252, 395.2, 395.21

(56) References Cited

U.S. PATENT DOCUMENTS

| | | | |
|---|---|---|---|
| 5,691,975 A | * 11/1997 | Hamada et al. | 370/232 |
| 2003/0198204 A1 | * 10/2003 | Taneja et al. | 370/332 |

OTHER PUBLICATIONS

G. Kesidis, "ATM Network Performance," Kluwer, Boston, MA, 4 pages, 1996.
A. Elwalid et al., "Design of Generalized Processor Sharing Schedulers which Statistically Multiplex Heterogeneous QoS Classes," Proc. of IEEE INFOCOM'99, pp. 1–35, Mar. 1999.
A. Elwalid et al., "A New Approach for Allocating Buffers and Bandwidth to Heterogenous, Regulated Traffic in an ATM Node," IEEE Journal on Selected Areas in Communications, vol. 13, No. 6, pp. 1115–1127, Aug. 1995.
P. Bender et al., "CDMA/HDR: A Bandwidth Efficient High Speed Wireless Data Service for Nomadic Users," QUALCOMM, pp. 1–34, undated.
D. Stiliadis and A. Varma, "Rate Proportional Servers: A Design Methodology for Fair Queuing Algorithms," IEEE/ACM Trans. Networking, vol. 6, No. 2, pp. 164–174, Apr. 1998.
D. Stiliadis and A. Varma, "Efficient Fair Queuing Algorithms for Packet Switched Networks," IEEE/ACM Trans. Networking, vol. 6, No. 2, pp. 175–185, Apr. 1998.

* cited by examiner

*Primary Examiner*—Melvin Marcelo

(57) ABSTRACT

The scheduling of data transmissions in a CDMA system or other type of wireless communication system is implemented using a rate processor sharing approach in which user Quality of Service (QoS) requirements for forward link data transmission are converted into a rate and a corresponding violation probability, and an available system resource such as power is then divided among the users in accordance with the rates. For example, the approach may determine for each user i a rate $R_i$ to be provided for user i with a probability $1-e^{-\delta_i}$, where the $\delta_i$ are determined independently for each of the users. The system resource may be divided among the users in a manner which satisfies a linear relationship involving the rates and corresponding cost factors of the users. The portion of the system resource allocated to a given user may be fixed for a designated scheduling interval. The approach may also utilize statistical multiplexing to achieve performance gains for multiple bursty users, and may include an admission control function.

17 Claims, 5 Drawing Sheets

RATE PROCESSOR SHARING METHOD AND APPARATUS FOR SCHEDULING DATA TRANSMISSIONS IN A CDMA WIRELESS COMMUNICATION SYSTEM

PRIORITY CLAIM

The present application claims the priority of U.S. Provisional Application No. 60/151,541 filed Aug. 31, 1999 in the name of inventors K. Kumaran and P. A. Whiting and entitled "Rate Processor Sharing: A Robust Technique for Scheduling Data Transmissions in CDMA Wireless Networks."

FIELD OF THE INVENTION

The present invention relates generally to wireless communication systems and more particularly to techniques for scheduling data transmissions in wireless code division multiple access (CDMA) systems and other types of wireless systems.

BACKGROUND OF THE INVENTION

An increasingly important issue in CDMA systems and other types of wireless systems is scheduling and rate allocation for data transmissions from system base stations to mobile users, i.e., forward link data transmissions. Such systems are moving toward configurations in which mobile users will have heterogenous Quality of Service (QoS) and traffic characteristics. The problem that arises is to how to share resources between mobiles in such a way that their QoS requirements can be effectively met while operating the system with a reasonable level of efficiency. This situation is to be contrasted with that of voice traffic, for which CDMA allows statistical averaging to take place among a large number of delay intolerant users with a common requirement. For data traffic, which is typically more bursty and delay tolerant than voice traffic, scheduling can be used to manage power usage and as a mechanism to control interference.

A conventional scheduling approach used in wired systems is referred to as Generalised Processor Sharing (GPS), and is described in greater detail in, e.g., G. Kesidis, "ATM Network Performance," Kluwer, Boston, Mass., 1996, S. Keshav, "An Engineering Approach to Computer Networking," Addison Wesley, Reading, Mass., 1997, D. Stiliadis and A. Varma, "Rate Proportional Servers: A Design Methodology for Fair Queuing Algorithms," IEEE/ACM Trans. Networking, 6:164–174, April 1998, and D. Stiliadis and A. Varma, "Efficient Fair Queuing Algorithms for Packet Switched Networks," IEEE/ACM Trans. Networking, 6:175–185, April 1998, all of which are incorporated by reference herein. The GPS approach converts user QoS requirements into a minimal rate assignment which is provided with high probability, and also provides a Call Admission Control (CAC) framework. The GPS approach is based in part on statistical multiplexing, as described in, e.g., A. Elwalid and D. Mitra, "Design of Generalized Processor Sharing Schedulers which Statistically Multiplex Heterogeneous QoS Classes," Proc. of IEEE INFOCOM'99, March 1999, pp. 1220–1230, and A. Elwalid, D. Mitra, and R. H. Wentworth. "A New Approach for Allocating Buffers and Bandwidth to Heterogenous, Regulated Traffic in an ATM Node," IEEE Journal on Selected Areas in Communications, 13(6): 1115–1127, August 1995, both of which are incorporated by reference herein.

Despite the advantages provided by the GPS approach in wired systems, the approach is not readily applicable to wireless systems due to wireless-specific complications such as power control and user interference. Therefore, what is needed is an improved approach for scheduling data transmissions in CDMA systems and other types of wireless systems.

SUMMARY OF THE INVENTION

The invention provides methods and apparatus for scheduling data transmissions in CDMA systems and other types of wireless communication systems.

In accordance with the invention, the scheduling of data transmissions in a CDMA system or other type of wireless communication system is implemented using a rate processor sharing approach. This approach converts user Quality of Service (QoS) requirements for forward link data transmission into a rate and a corresponding violation probability, and then divides an available system resource such as transmission power among the users in accordance with the rates. For example, the approach may determine for each user i a rate $R_i$ to be provided for user i with a probability $1-e^{-\delta_i}$, where the $\delta_i$ may be determined independently for each of the users. The system resource may be divided among the users in a manner which satisfies a linear relationship involving the rates and corresponding cost factors of the users. The portion of the system resource allocated to a given user may be fixed for a designated scheduling interval.

In accordance with another aspect of the invention, statistical multiplexing gain may be provided for applications involving multiple bursty users by generating a characterization of the forward link data transmission activity $\alpha_i$ of each user i. The activity factor $\alpha_i$ denotes the fraction of time the user i actually uses its assigned portion of the system resource. The activity factor $\alpha_i$ is a function of the rate $R_i$ of the user i, which is preferably selected to be between a peak rate and a mean data rate for the user i. A queuing model may be used to determine a minimum rate $R_i$ and corresponding activity factor $\alpha_i$ that would meet the QoS requirement of user i with a high target probability.

In accordance with another aspect of the invention, an admission control function is provided in which an exact computation or a Chernoff bound approximation is utilized to determine rate violation probabilities for each of the users. The admission control function ensures that a given one of the users is admitted to utilize a portion of the available system resource only if its corresponding rate violation probability meets one or more established criteria.

Advantageously, the rate processor sharing approach of the present invention provides a robust means of system resource sharing in which users with heterogenous QoS requirements can be efficiently supported.

DETAILED DESCRIPTION OF THE INVENTION

The present invention will be illustrated below in conjunction with an exemplary code division multiple access (CDMA) wireless communication system. It should be understood, however, that the invention is not limited to use with any particular type of communication system, but is instead more generally applicable to any wireless system in which it is desirable to provide improved scheduling of data transmissions. For example, although the techniques are illustrated with reference to certain types of CDMA systems, it will be apparent to those skilled in the art that the techniques are also applicable to other CDMA systems, as well as to other types of wireless systems.

Figure 1:
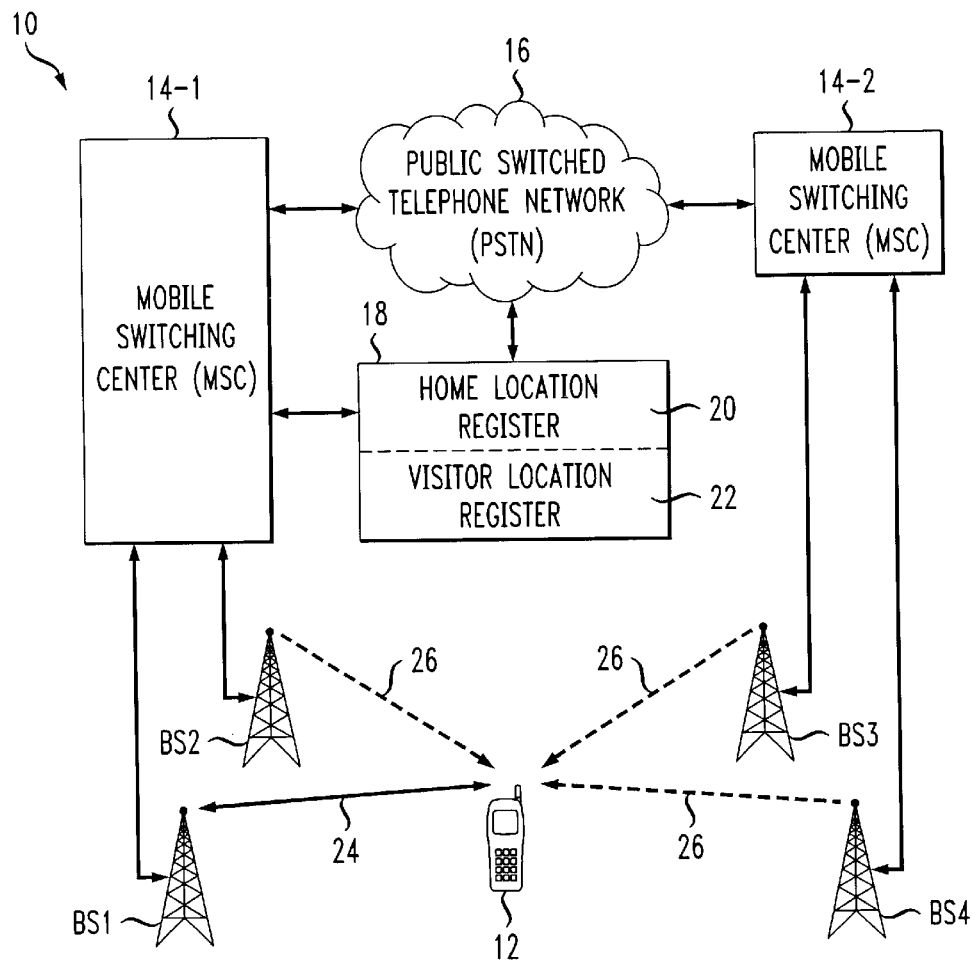
FIG. 1 shows an exemplary code division multiple access (CDMA) wireless communication system in which a rate processor sharing (RPS) technique for scheduling of data transmissions in accordance with the invention may be implemented.

FIG. 1 shows an exemplary cellular or PCS system 10. The system 10 may be configured in accordance with well-known conventional wireless communication system standards. The system as illustrated includes a mobile station (MS) 12 and a number of base stations BS1, BS2, BS3 and BS4. The base station BS1 of FIG. 1 represents a primary base station, communicating with mobile station 12 via the path designated by solid two-way arrow 24, while the surrounding base stations BS2, BS3 and BS4 may serve as secondary base stations which can detect signals transmitted via the paths indicated by dashed one-way arrows 26. The primary base station BS1 communicates with the mobile station 12 using CDMA techniques such as described in the above-cited standards documents. As the mobile station 12 moves within the system 10, handoffs occur, such that base stations other than BS1 become primary base stations for communicating with the mobile station 12. Also, handoffs may occur from a given antenna sector of the primary base station and another sector of that base station.

The system 10 in this illustrative embodiment also includes first and second mobile switching centers (MSCs) 14-1 and 14-2. A given MSC typically connects several BSs with a public switched telephone network (PSTN) 16. For example, MSC 14-1 connects base stations BS1 and BS2 with the PSTN 16 and MSC 14-2 connects base stations BS3 and BS4 with the PSTN 16. The system 10 also includes a memory 18 having a number of registers including a home location register (HLR) 20 and a visitor location register (VLR) 22. The HLR 20 and VLR 22 store user data and billing information for each mobile station 12 of the system 10.

Figure 2:
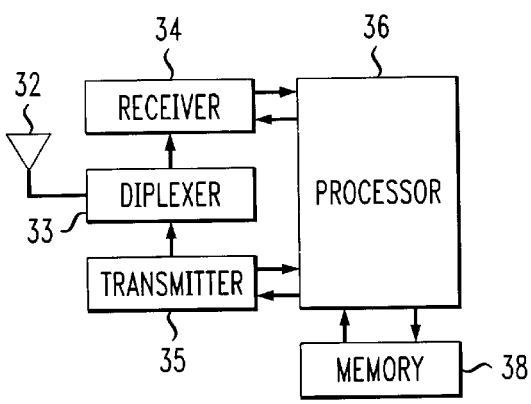
FIG. 2 is a block diagram showing an apparatus which can be utilized in scheduling data transmissions in accordance with the invention.

FIG. 2 shows a more detailed view of an apparatus which represents a given one of the base stations BS1, BS2, BS3 or BS4 of the system 10. The apparatus includes an antenna 32 which receives signals from and transmits signals to other elements of the system 10. A receive signal is directed by a diplexer filter 33 to an input of a receiver 34 which may implement conventional downconversion, demodulation, digital-to-analog conversion and other processing of the receive signal. A transmitter 35 performs complementary operations such as analog-to-digital conversion, modulation and upconversion to generate a transmit signal which is directed via diplexer 33 to the antenna 32 for transmission.

A processor 36 is coupled to both the receiver 34 and the transmitter 35. The processor 36 operates in conjunction with a memory 38 to control the communication functions of the base station BSi. For example, data or other information in messages which are part of a receive signal may be supplied to processor 36 such that processor 36 can implement the rate processor sharing operations to be described in greater detail below.

The present invention provides improved techniques for scheduling of data transmissions in a CDMA wireless system such as that illustrated in FIG. 1. An illustrative embodiment of the invention to be described in detail below provides an algorithm referred to as Rate Processor Sharing (RPS) for scheduling data transmissions on the forward or base-to-mobile link of a CDMA wireless system. Advantageously, RPS provides an effective means of performing Call Admission Control (CAC) in the presence of users with heterogenous Quality of Service (QoS) requirements and traffic characteristics.

In CDMA systems, user transmissions are power controlled in order to combat the effects of significant and rapid fluctuations in channel conditions and interference. RPS takes this into account by choosing the transmission costs in such a way that the probability of an overload through these fluctuations is held at an acceptable level.

It will assumed for purposes of clarity and simplicity of description that a given single CDMA cell in the illustrative embodiment includes n mobile data users distributed randomly within the cell. The users communicate only with this cell, so that there is no soft handoff. The cell has a total power P with which to perform data transmissions over its forward link. Note that this power will vary between cells in the system as each cell is allocated a different peak power according to its load and the load of its neighbors. The optimal allocation of these powers is a system-level problem which is outside of the scope of the present invention. There is a QoS requirement for each user which in general may take various forms including mean delay, probability of exceeding a given delay threshold, etc. The user signals are transmitted using orthogonal codes, so that they can be taken as non-interfering within the same multi-path "ray" but not across a set of such rays.

It should be emphasized that these and any other assumptions made herein are for purposes of illustration only, and not intended to limit the scope of the invention in any way. These assumptions therefore need not hold in any particular embodiment of the invention, as will be apparent to those skilled in the art.

Suppose that the power a user requires to achieve a given rate R is independent of the power assigned to other users within the cell. Clearly this is the case if there is perfect orthogonality since the within-cell interference is removed at the mobile receiver. As will be described in detail below, this is also a reasonable supposition when there is imperfect orthogonality arising from multi-path propagation.

But first the relationship between power and rate for an individual user will be considered. An idealized assumption is made that the peak power a user requires is linearly dependent on the rate. The constant of proportionality $c_i$ for user i is referred to as the effective weight of that user. In practice, of course, the power needed to transmit at a given rate is time varying. To take this variability into account, it will be assumed that the peak power requirement of the user can be set, for the given rate, according to a statistical criterion. It can thus be seen that $c_i$ is determined as $P_i^{Peak}/R_i$ which in general could depend on rate. In practice, the peak power requirement may be chosen according to a percentile of the distribution of the time varying power requirement or to another related statistical notion, as will be apparent to those skilled in the art. Under these circumstances, the power allocations $P_i$ must satisfy the following linear constraint, $$\sum_i P_i = \sum_i c_i R_i \leq P \qquad (1)$$

so as not to overload the base station transmitter.

The $c_i$ may be obtained in a straightforward manner using estimates of propagation and interference. For example, the coefficients $c_i$ for each user i may be estimated as follows. In order to decode the transmitted data signal, the energy per bit to interference density ratio (denoted as $\gamma$) must exceed a target. This leads to the following formula:

$$P_i = R_i \frac{\gamma I_i}{G_i W},$$

where $I_i$ is the measured or anticipated interference for the user during the transmission, $G_i$ is the path loss from the transmit antenna to the user, and W is the bandwidth of the system. The path loss may be estimated by measurements on a pilot signal from the desired base station. The interference may be estimated by measuring the pilot signal strengths of nearby base stations and from knowledge of their transmit powers.

It should be noted that the interference $I_i$ is really a future variable since it represents the interference that is taking place when the transmission is actually made. It is implicit therefore that this interference is anticipated in some manner. The uncertainty in this case is that one needs to know what the interference will be, which implies knowledge of what traffic will be on the adjacent base stations at the time of transmission. There are various means by which the system can be arranged to make this prediction reasonable, as will be apparent to those skilled in the art. For a pure delay tolerant system, a simple although possibly inefficient approach is to assume the base stations transmit at full power all the time, such that interference can be determined directly from the pilot signals. A more sophisticated approach for the same type of system is to have each base station declare a transmit power limit for a given period which will be based on the congestion at that base station and possibly also the congestion at other base stations.

For purposes of illustration, the invention will be described herein using as an example the empirically obtained interference distribution given in A. J. Viterbi, "CDMA, Principles of Spread Spectrum Communication," Addison-Wesley, 1995, which is incorporated by reference herein. The details of how the $c_i$ are obtained using this example distribution are given in Appendix A below.

As noted previously, the individual user power requirements may be considered as independent even when there is multi-path propagation. Suppose that (a) each cell's total transmit power $P^T$ is constant in time, and (b) the multi-path propagation arises from a fixed number of rays, such as two rays. Let $\phi$ be the proportion of the total signal received in the first ray and $1-\phi$ be the remaining proportion received in the second ray. If perfect orthogonality is assumed between signals within the same ray, and it is also assumed that the net signal to noise ratio (SNR) is obtained by adding the individual SNRs from each ray, then the SNR for user i is given by $$\frac{P_i G_i \varphi}{I_i + P^T G_i (1-\varphi)} + \frac{P_i G_i (1-\varphi)}{I_i + P^T G_i \varphi},$$

where $P_i$ is the total signal power transmitted to user i, $G_i$ the propagation gain from the base station to user i, and $I_i$ the net external interference and noise for user i. Note that $P^T G_i$ represents the total power received by user i from its base station. Thus, if the total transmitted power $P^T$ is held constant, each user's received SNR is proportional to the transmitted power $P_i$. Implicit in this example model is the assumption that a user's receiver cannot eliminate "self-interference" from its own signal in the alternative ray. This is a reasonable assumption since most receivers used currently do not have this capability.

Given the above assumptions, the model for the CDMA wireless forward link is thus equivalent to a single server queue in which there is net service capacity and the rate each user can obtain depends on a user dependent cost constrained as in (1). In the following description, it will be assumed that these rates can be continuously assigned, i.e., any rate-tuple satisfying (1) is feasible. It then follows that the problem of meeting the user QoS requirements is simply one of determining what instantaneous powers should be assigned. While in principle power adjustments can be done instantaneously, this is clearly far from practical and so for the illustrative embodiment it will be assumed that all user powers are held fixed within short periods referred to herein as scheduling intervals.

The manner in which the rates $R_i$ and the parameters of the RPS algorithm are selected for each user i will now be described. The simplicity of the RPS approach, like that of the above-noted conventional GPS approach, arises mainly from the isolation it provides to individual users, which can be used to select their guaranteed rates $R_i$ independently as the minimum rates that would meet the user QoS requirements with certainty. This allows a clean separation of the queuing and QoS related issues from the wireless aspects of the problem.

As in GPS, once such a rate has been determined, the user with a weight $\phi_i$ that would guarantee this rate when the user's queue is active is admitted. These weights, which correspond to minimum power assignments, then control the sharing between users via the customary GPS principle of proportional sharing.

$$P_i = \frac{\phi_i}{\sum_{j\ active} \phi_j} P. \qquad (2)$$

Furthermore, in order to extract multiplexing gain when substantial numbers of bursty users are present, a characterization is required of the activity $\alpha_i$ of each user i, which denotes the fraction of time the user actually uses his assigned power. This factor depends on $R_i$, since it denotes the fraction of time the user's queue is being served, which is generally larger than the fraction of time the user sends data.

Figure 3:
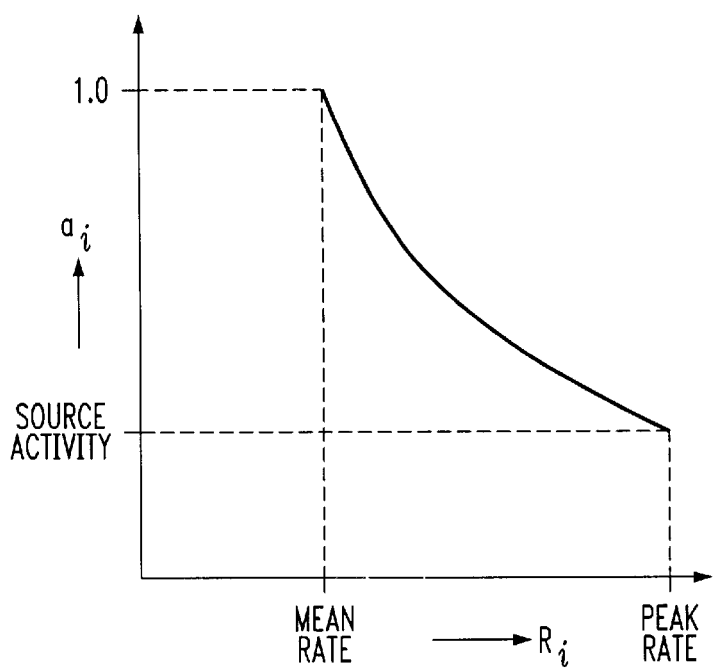
FIG. 3 is a plot of user activity as a function of rate in an illustrative embodiment of the invention.

FIG. 3 shows a plot of the user activity $\alpha_i$ as a function of rate $R_i$. It can be seen from the plot that if $R_i$ is chosen to be the mean data rate, $\alpha_i = 1$, while choosing $R_i$ to be the peak rate would yield $\alpha_i$ to be just the source activity factor of the user. For intermediate rates, $\alpha_i$ lies between these two extremes. Knowledge of this factor, under the assumption that users are independent and non-colluding, will lead to the appropriate weight assignments and an admission control procedure, as will be described in detail below.

As noted previously, the conventional GPS approach utilizes statistical multiplexing in the context of wire-line networks, namely IP routers and ATM switches. The above-described linear model for achieved rate as a function of power allows the wireless data transmission scheduling problem to be cast in similar terms. However, the techniques used to solve the problem are different in the wireless context, since, e.g., the number of data users in each cell is assumed to be typically small, unlike the IP/ATM scenario.

As described in the above-cited reference A. Elwalid and D. Mitra, "Design of Generalized Processor Sharing Schedulers which Statistically Multiplex Heterogeneous QoS Classes," Proc. of IEEE INFOCOM'99, March 1999, pp. 1220–1230, one may formulate this problem for regulated connections with known traffic characteristics and QoS using simple worst-case estimates for $R_i$ and $\alpha_i$, e.g., as described for the dual-leaky-bucket-regulators in the above-cited reference A. Elwalid, D. Mitra, and R. H. Wentworth. "A New Approach for Allocating Buffers and Bandwidth to Heterogenous, Regulated Traffic in an ATM Node," IEEE Journal on Selected Areas in Communications, 13(6): 1115–1127, August 1995. The latter reference refers to the lossless effective-bandwidth of a connection $e_i^{(0)}$, which corresponds to the required rate $R_i$, and the on-off activity factor $\omega_i$ for the bandwidth, which corresponds to the activity $\alpha_i$. This is an important special case, as this and similar simple forms of traffic regulation have become widely adopted. In the absence of such regulation, one may utilize a more sophisticated bursty on-off traffic model for data, such as that to be described in detail below, from which one may infer $R_i$ and $\alpha_i$ using the queuing analysis described in Appendix C.

Figure 4:
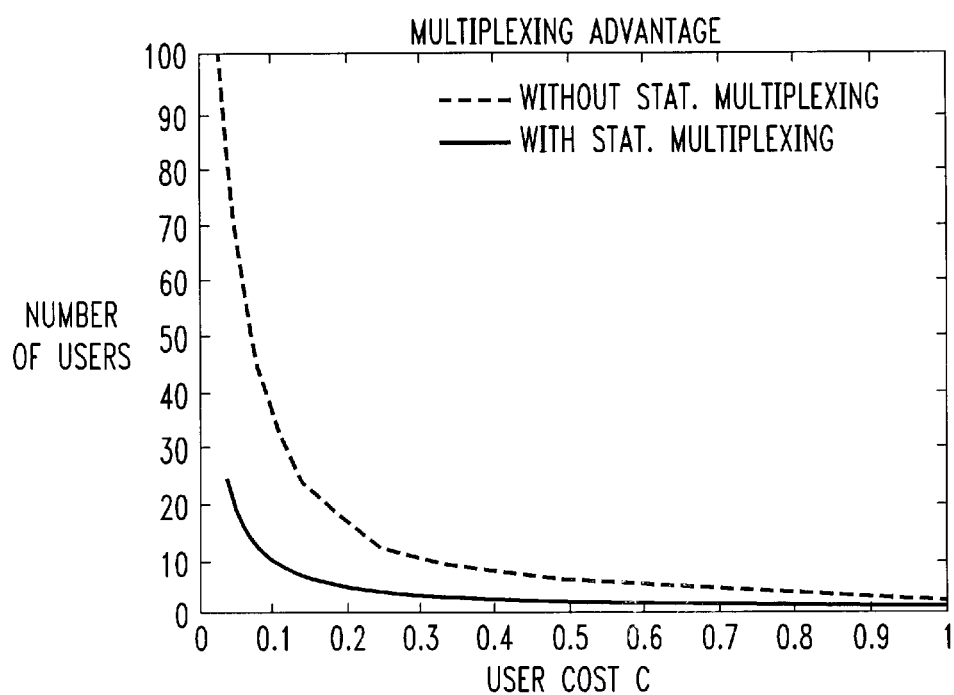
FIG. 4 is a plot illustrating the benefits of statistical multiplexing when all users have a common transmission cost, in an RPS technique in accordance with the invention.

FIG. 4 shows a plot illustrating the benefits of statistical multiplexing when all users have a common transmission cost C. The figure plots the number of identical users, all with the same transmission cost C, that can be supported as a function of C with and without statistical multiplexing, and the former is seen to be a factor of 2–4 larger. This was done for a unit rate requirement with activity 0.1 for all users and a total power of unity. Notice that the multiplexing advantage grows rapidly for small C, as a large number of users provide much better averaging in cumulative activity.

The manner in which the rate allocations $R_i$ are determined in the illustrative embodiment will now be described in greater detail. As mentioned previously, regulated connections can be assigned rates in a simple manner, while unregulated ones can make rate requests using more complex criteria selected by the user. Transferring the burden of rate specification to the user is a practical and realistic option, as applications vary widely in traffic characteristics and QoS demands. Furthermore, pricing may be used to enforce efficient use and thereby keep the throughput of the system high.

As noted above, RPS provides a robust means of resource sharing in which users with heterogenous requirements can be supported. This flexibility mainly arises from translating a user requirement into the provision of a given rate (or, equivalently, power), with a given high target probability. Unlike other service metrics like delay, loss or buffer occupancy, rate can be controlled in a nearly instantaneous manner and produces immediate effect on the user state.

Example simulation results to be presented below will consider users who have a delay requirement which must be satisfied with a given probability. In this case user i's QoS requirement is of the form $$Pr\{S_i > T_i\} \leq \delta_i, \quad (3)$$

where $S_i$ is the steady-state delay (or, equivalently, sojourn time=waiting time+transmission time), and parameters $T_i$ and $\delta_i$ are delay thresholds and a prescribed tail probability, respectively. The simulation results presented below will show that this can be met by providing a target rate $R_i$ with a given high probability $1-\epsilon_i$. Other types of QoS criteria could be accommodated in a similar manner.

For the purposes of the simulation results described below, it will be assumed that each mobile is receiving traffic from statistically identical independent Markov Modulated ON-OFF sources with mean off time $\beta^{-1}$ and mean on time $\alpha^{-1}$. During the on period packets arrive as a Poisson stream with rate $\lambda$. Packets are taken to be of constant length and are assumed to arrive instantaneously. The mean arrival rate of packets is referred to as the source activity factor, $s_i = s$, $$s_i = s = \frac{\beta}{\alpha + \beta}. \quad (4)$$

Using these parameters, the queuing model presented in Appendix C describes how one may arrive at a minimum rate $R_i$ that would meet the user's delay with near certainty. The queuing model also provides the queue activity factors $\alpha_i$ defined before.

Clearly, better characterization of the traffic allows better and less conservative choices for $R_i$ and $\alpha_i$, resulting in higher capacity. For ease of implementation, one may tabulate the rate requirements and activity factors for a pre-designated set of user classes expected to be served. Also, as mentioned previously, allowing a higher granularity in rates will reduce packing losses and improve efficiency.

A method for setting the weights $\phi_i$ will now be described. Equation (2) is rewritten as $$P_i = \frac{\phi_i}{\sum_j x_j \phi_j} P. \quad (5)$$

where $x_j$ is an instantaneous binary activity indicator random variable of user j that determines an instantaneous power assignment for all active users. All users are assumed to be independent and non-colluding, i.e., the $x_j$ are independent, identically distributed (i.i.d.). To impose the QoS criterion described previously, $\phi_i$ must be picked so as to satisfy $$Pr\left[\frac{\phi_i}{\sum_j x_j \phi_j} \frac{P}{c_i} \leq R_i\right] \leq e^{-\delta_i} \quad (6)$$

or equivalently $$Pr\left[\sum_{j \neq i} x_j \phi_j > \left(\frac{P}{c_i R_i} - 1\right) \phi_i\right] \leq e^{-\delta_i}. \quad (7)$$

Note that when the of $\delta_j = \delta$ are all equal and much larger than unity, and the activity factors $\alpha_i >> e^{-\delta i}$, the choice $\phi_i = c_i R_i$ is bound to be a reasonably good one. This conclusion, borne out by the simulation results described below, is a very convenient one for practical implementations of the RPS algorithm. To see this, consider the following properties of the optimal choice of weights in Equation (7).

The QoS requirements are balanced follows. Whenever a feasible weight vector $\phi$ exists, there is a choice $\phi^*$ that equalizes all the probabilities $$P_i \equiv Pr\left[\sum_{j \neq i} x_j \phi_j > \left(\frac{P}{c_i R_i} - 1\right)\phi_i\right]$$

and achieves feasibility. This follows from the fact that each of the $P_i$ are monotonically decreasing functions $\phi_i$ and monotonically increasing in $\phi_j$, $j \neq i$. Thus, given any feasible vector $\phi$, for which $\max_i P_i \leq e^{-\delta}$, one may adjust the components until the $P_i$ are equalized so as to always lower $\max_i P_i$. This may be done, for example, by lowering $\phi_k$ where k is the index corresponding to smallest value of P, thus raising $P_k$ and lowering all other $P_i$, $i \neq k$.

A useful identity can be obtained by noting that $$a_i Pr\left[\sum_{j \neq i} x_j \phi_j > \left(\frac{P}{c_i R_i} - 1\right)\phi_i\right] + (1 - a_i) Pr\left[\sum_{j \neq i} x_j \phi_j > \frac{P}{c_i R_i}\phi_i\right] = Pr\left[\sum_j x_j \phi_j > \frac{P}{c_i R_i}\phi_i\right].$$

This identity can be written more concisely as $$\alpha_i P_i + (1-\alpha_i) Q_i = R_i.$$

Given that $0 < \alpha_i < 1$, this identity implies the orderings $P_i > R_i > Q_i$ and $$Q_i < P_i < \frac{Q}{a_i}.$$

For the choice $$\phi_i = c_i R_i, \, R_i = R = Pr\left[\sum_j x_j c_j R_j > P\right]$$

for all i. If it is also assumed that no one user dominates the power, i.e., $$\frac{P}{c_i R_i} >> 1$$

for all i, and $\alpha_i >> e^{-\delta}$, e.g., $\alpha_i$ is of order $10^{-1}$ while $e^{-\delta}$ is of order $10^{-3}$ or less, it follows that the $P_i$, when feasible, are roughly "equal" in a logarithmic sense. This means that they differ from each other by a factor of at most $$\frac{1}{min_i a_i},$$

or their logarithms differ by at most $\log(\min_i \alpha_i)$, which is generally much smaller than $\log(P_i)$. In this case, the optimal choice satisfies $\phi_i = c_i R_i + \epsilon_i$ where the $\epsilon_i$ are incremental. This is due to the fact that the tails of all the distributions are nearly exponential (when the number of users is appreciably larger than 1) and hence the $P_i$, which are off by no more than an order of magnitude when $\alpha_i$ are of order $10^{-1}$, are highly sensitive functions of $\phi_j$ of the form $e^{-(\cdot)\Phi_j}$. Also, when $$\frac{P}{c_i R_i} >> 1$$

for all i, any choice of $\phi_i$ differing substantially from $c_i R_i$ cannot equalize the $P_i$ since the $R_i$ would all differ substantially in this case. It hence follows that the solution in the neighborhood of $c_i R_i$ is the unique optimum.

Thus, it can be seen that when the users have identical rate violation probabilities, the user weights simply take the form of their minimum power requirement $\phi_i = P_i = c_i R_i$. One may then achieve heterogeneity in service by setting the $R_i$ aggressively or conservatively. However, if different $\delta_i$ are desirable for some applications, Appendix B shows how to use the Chernoff approximation on Equation (7) to compute the $\phi_i$ in this case. The iterative improvement described there may also be used to refine the choice $\phi_i = c_i R_i$ when the $\delta_i$ are all equal. However, these calculations are generally more computationally involved and less attractive for implementation.

The Connection Admission Control (CAC) feature of RPS will now be described in greater detail. More particularly, the following will describe the criteria that must be used in conjunction with the above parameter settings to decide whether the QoS of an arriving user can be met.

In the general case, given the weights $\phi_i$, the refined Chernoff approximation described in Appendix B (or an exact computation if the number of users is much smaller than 10) may be used to compute the rate violation probabilities $P_i$ defined above, and an incoming user will be admitted if all the $P_i$ are acceptable.

In the special case when the $\alpha_i$ and $\delta_i$ are all equal, it can be shown that the most constrained user would be the one with the largest cost, say user k with cost $c_k$. In this case, it is necessary to check only one condition, i.e., that $P_k$ is acceptable. With the simple choice of weights $\phi_i = c_i R_i$, $\alpha_i$, different but all of the same order of magnitude (say $10^{-1}$), and $\delta_i = \delta$ much larger than $-\ln \alpha_i$, one can use $$\frac{R}{min_i a_i}$$

as a conservative estimate of the worst $P_i$. In this case, the admission criterion simplifies to $$-\ln R \leq \gamma$$

where $\gamma = \delta - \ln[\min_i \alpha_i]$. If any of these assumptions are valid, the admission control can be reduced to checking a single condition using the refined Chernoff approximation.

In the general case, when a large number of heterogeneous users are present, RPS may require a check of global feasibility. If this is inconvenient, one may consider the alternative approach of classifying users based on their QoS requirements, traffic characteristics and cost of transmission $c_i$. Such classification would allow the pre-computation and storage of an "admissible region" in this multi-dimensional user space using RPS, which may then be used to make fast decisions in real-time. One may further simplify to avoid storing such information by approximating this admissible region by a linear region which associates an "effective power" with each user. These approaches, which are standard in conventional networking, are likely to be more useful as the number and types of data users becomes large.

TABLE 1

Survivor Distribution for the Number of
Customers Left Behind in Queue n

| Number of Customers n | Analysis | Simulation |
|---|---|---|
| 0 | 0.491459 | 0.491737 |
| 1 | 0.222269 | 0.222510 |
| 2 | 0.092868 | 0.093123 |
| 3 | 0.036515 | 0.036679 |
| 4 | 0.011497 | 0.013996 |
| 5 | 0.005233 | 0.005275 |
| 6 | 0.001963 | 0.001983 |
| 7 | 0.000738 | 0.000741 |
| 8 | 0.000277 | 0.000280 |
| 9 | 0.000104 | 0.000105 |
| 10 | 0.000039 | 0.000040 |

Table 1: Survivor Distribution for the Number of Customers Left Behind in Queue n The simulation results referred to above will now be described in greater detail, with reference to Table 1 and FIG. 5. The example used as a basis for the simulations considers groups of mobiles with independent statistically identical sources and a common service requirement. The source is an on-off bursty source with on and off periods being mutually independent, exponentially distributed with mean on time 93 ms. and mean off time 907 ms. The rate of generation of packets when a source is on is 9 pkts/s, so that the mean packet arrival rate is 0.093×9=0.837 pkts/s. The packet sizes are assumed to be constant with length 10 kbits. The common QoS requirement is that packet be transmitted with a delay of greater than 1s with a probability of 0.01 or better.

As described previously, one may treat each source in isolation from others and seek to determine the bit rate R sufficient to meet the above-noted delay requirement. The queuing analysis in Appendix C, which exploits the fact that the arrival and departure distributions coincide in equilibrium, allows the tail probability for delay beyond 1 second to be bounded for any given rate. See, e.g., L. Kleinrock, Queuing Systems, Volume 1, Wiley, 1975, which is incorporated by reference herein.

Table 1 gives the survivor distribution for the number of customers left behind in queue, with results obtained from inversion of the generating function and from simulation using a total of $10^7$ events were used. The results were obtained using the above parameters and a service rate of R=60 kbits/s. The second column was obtained from the generating function using inversion techniques outlined in J. Abate and W. Whitt, "The Fourier Series Method For Inverting Transforms of Probability Distributions," Queuing Systems 10, 1992, pp. 5–88, which is incorporated by reference herein. The third column shows the results which were obtained from simulation, and these results show close agreement with the analysis results of column two.

Figure 5:
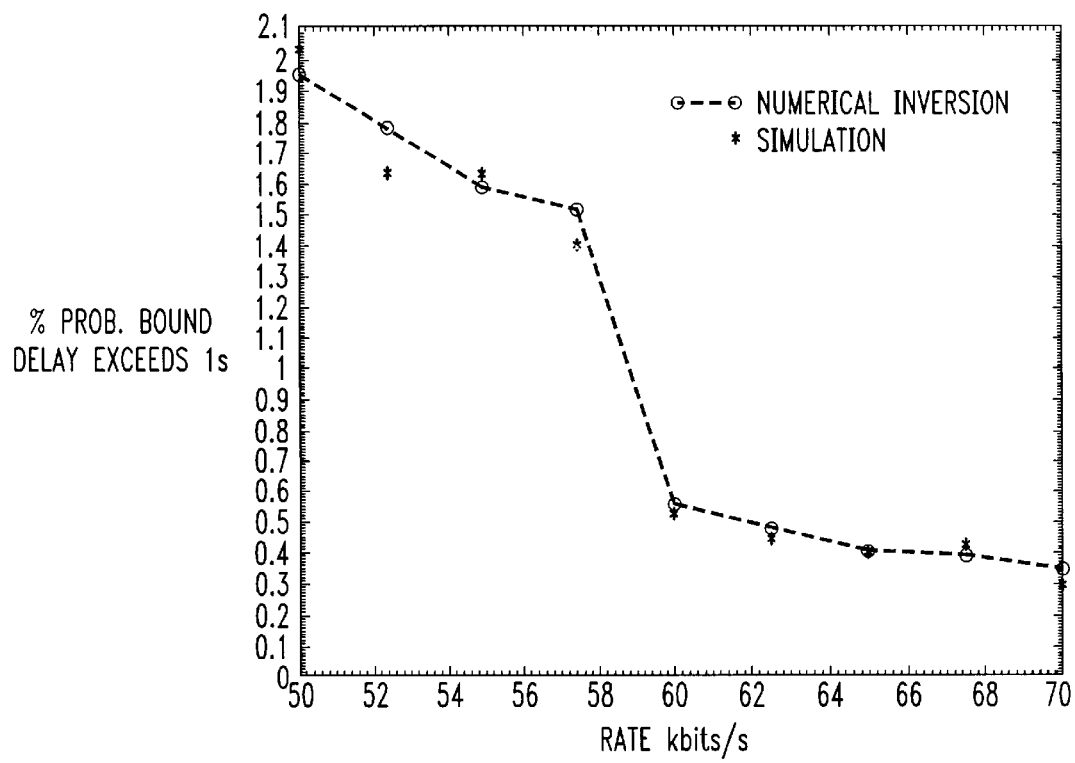
FIG. 5 shows a plot of a probability bound for delay.

FIG. 5 shows a plot of the probability of delay exceeding 1 second for bit rates in the range of 50–75 kbits/s, using departure results such as those described above. It is well known that this distribution coincides with the number an arrival finds in queue. The tail probability of transmission delay may thus be bounded by assuming that the transmission of the first packet in queue at the time of an arrival has only just been initiated. The large drop in probability around 60 kbits/s corresponds to the fact that the bound requires that there be no more than 4 packets in queue for rates R>60 kbits/s whereas a delay of 1 second can always be achieved for rates R≧60 kbits. As the plot shows, the minimum rate which is required to meet the delay requirement in this example is approximately 60 kbits/s.

An estimation of capacity for a CDMA system utilizing the above-described RPS algorithm will now be provided. Clearly, the realized capacity is a function of the algorithm, and only provides a lower bound to the true capacity. However, it is expected that RPS is efficient and hence provides a good indication of the true capacity of the system.

For simplicity it is assumed that the data traffic model for all users is the same. Let $\epsilon$ and $f$ be some fixed (small) numbers in [0, 1]; the quantity 1−$\epsilon$ is the cell "Grade-of-Service." The following definitions will be used:

1. The maximum value of N such that the average fraction of users for which QoS is achieved is at least 1−$\epsilon$.
2. The maximum number (1−$f$)M out of M randomly distributed users in a cell such that the average fraction of users achieving QoS is at least 1−$\epsilon$, (when the $f$M "worst" users are not served at all).

Note that definition 2 is a generalization of definition 1 with $f$ being non-zero. Note also that the above definitions do not assume that the QoS requirements of all users are the same. They can be easily extended to the case when the traffic models are different for different users, by replacing the maximum number of users by the maximum throughput achieved. In the case of common mean data rate the two differ by a factor of R.

The ability to meet QoS requirements of a set of users clearly depends not only on the number of users, but also on the distribution of the users within the cell, since users with higher $c_i$ values require more resources to meet their QoS. Thus it is clear that definition 2 will yield higher values of capacity (for any given scheduling algorithm) than 1. This is because the distribution of N=(1−$f$)M users with the smallest $c_i$ values chosen out of M randomly placed users is never worse than the distribution of N users placed randomly in the cell. Roughly speaking, the factor "$f$" reflects the fraction of mobiles that are blocked during admission control.

Figure 6A:
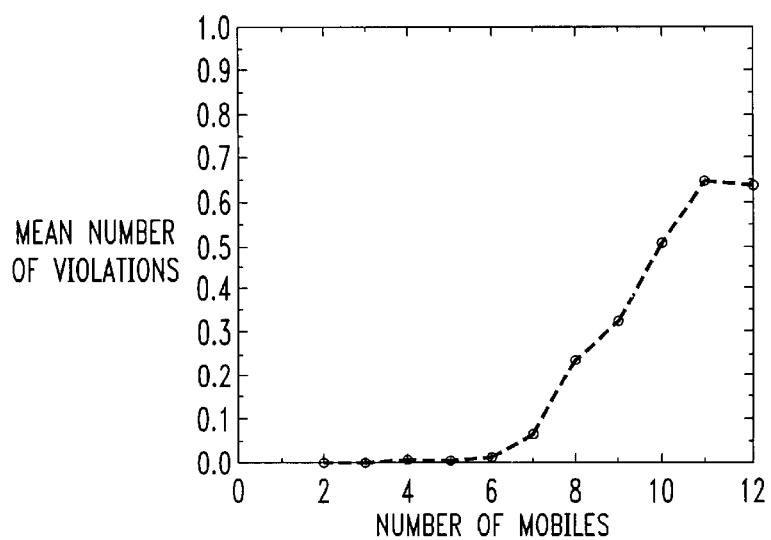
FIGS. 6A and 6B show plots of mean number of violations as a function of number of mobiles for random selection and lowest cost selection, respectively.
Figure 6B:
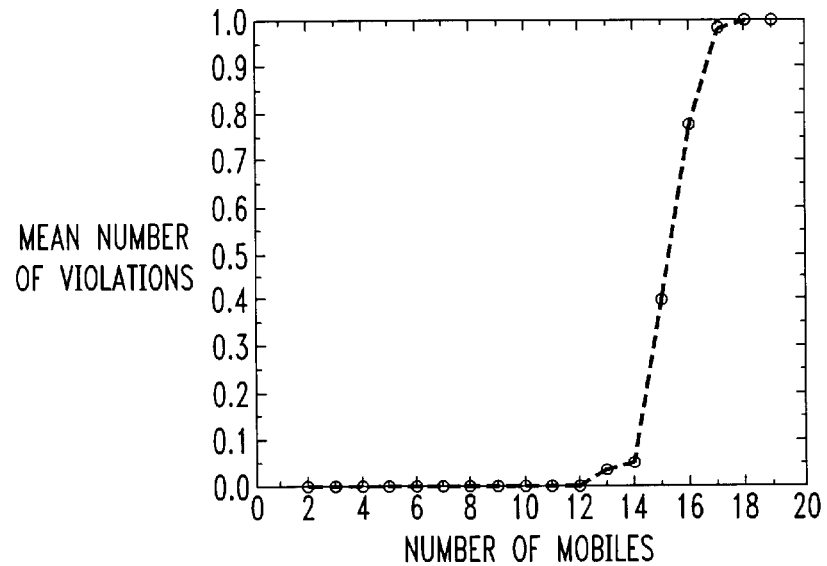

A number of additional simulation results are presented in conjunction with FIGS. 6A and 6B. In the examples used to generate these results, the user weights have been set to be proportional to their power requirements as described previously, i.e., $\phi_i=c_iR_i$, as $\delta_i=\delta=0.01$ is considered uniformly for all users. In this context, it should be noted that an attempt to refine the weights using the procedure given in Appendix B produced negligible benefits in these examples, thus reinforcing the fact that the simple choice $\phi_i=c_iR_i$ is very effective.

FIG. 6A shows the results for capacity assuming that mobiles are taken uniformly from the cell area. FIG. 6B shows the results for capacity when selecting the N users with lowest $c_i$. As expected, the results show that accepting users with relatively high $c_i$ leads to a reduction in capacity. Therefore, a much higher number of users can be supported if a restricted service is offered to users in "worst case" positions (typically near the edge of a cell). For example, restricting rates in accordance with the effective weights allows effective allocation of a certain fraction of forward link power whenever there is data to send to the mobile.

The simulation results presented in FIGS. 6A and 6B show that the choice of admission criterion has a large impact on capacity and therefore the performance of CDMA data transmission services. The number of users that could be supported in a given cell of the system could be increased by a factor of between two or three depending on the extent access to users with high effective weights is granted.

The RPS approach of the present invention provides an effective means to allocate resources on the forward link of a CDMA cell. More particularly, it enables admission control to be performed between users with heterogenous QoS requirements, by transforming these requirements into a minimum rate which is supplied with high probability. This probability can be computed accurately and efficiently by using a refined Chernoff approximation. In the case of a small number of users (less than about 10), this probability may be computed exactly. The probability computations form the basis for admission control at the time when a new user applies for admission.

The invention may use any of a number of different techniques for computing effective weights for each mobile user, as will be apparent to those skilled in the art. These weights are important in placing constraints on the probability of overload as a result of changes in propagation and interference as well as through chance fluctuations of power control. In addition, conventional techniques may be used to allocate resources at a system level, as opposed to the cell level description given for the illustrative embodiment.

It should also be noted that the RPS approach of the illustrative embodiment of the present invention has a number of drawbacks. For example, it does not adapt rate as the state of the queues change. It can be shown that adapting rate to queue lengths is a necessary characteristic of an optimal algorithm at least for some user criteria. It can also be shown that RPS is not always stable when in fact stability can be achieved. These drawbacks, taken together with the problem of parameter setting, show that this algorithm of the illustrative embodiment is not ideal. However, the flexibility and robustness of RPS nevertheless make it an attractive candidate for resource management of a wireless data link. Alternative embodiments of the invention may be configured to alleviate or eliminate one or more of the above-noted drawbacks.

The rate processor sharing techniques described herein can be implemented in whole or in part in the form of one or more software programs executed using appropriate system processing hardware, such as processor 36 and memory 38 in the apparatus of FIG. 2. The invention may be implemented in whole or in part in one or more base stations or in combinations of base stations and mobile stations.

The foregoing description of the invention is intended to be illustrative only. For example, the particular configuration of the system 10, the base station BS, and the mobile station 12 are for purposes of illustration only, and should not be construed as limiting the invention to any particular embodiment or group of embodiments. Moreover, the particular rate processor sharing implementations described herein are by way of example, and alternative embodiments of the invention may use other arrangements of processing steps. These and numerous other alternative embodiments within the scope of the following claims will be readily apparent to those skilled in the art.

Appendix A. Calculation of $c_i$ Values

Figure 7:
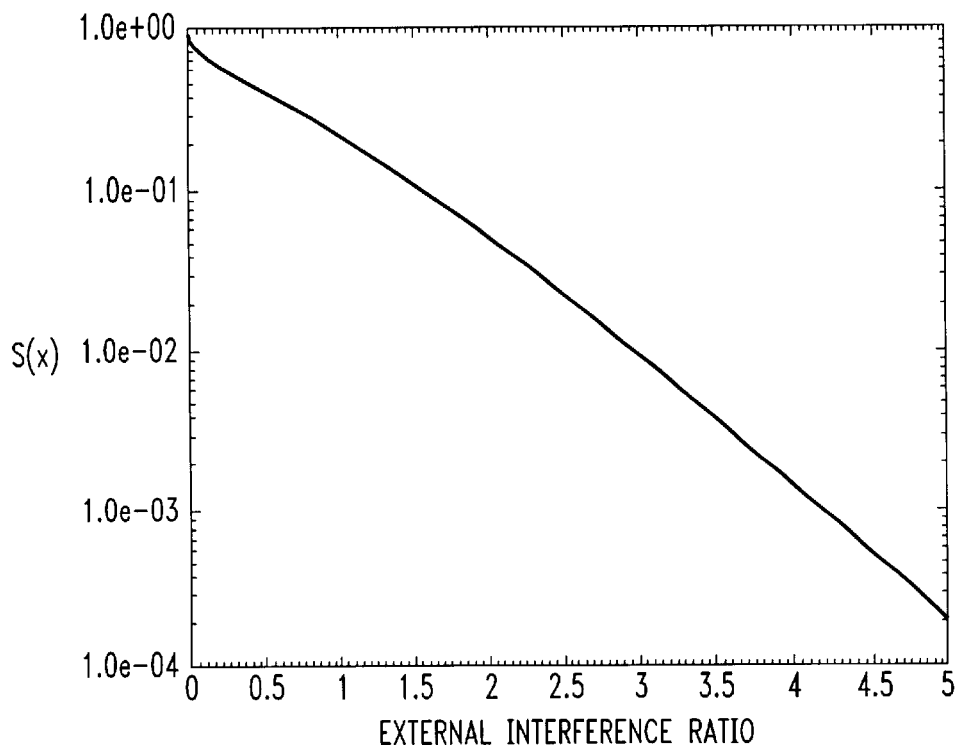
FIG. 7 shows a plot of the survivor function S(x) for external cell interference.

It is assumed that all base stations of the system transmit at maximum power at all times. When this maximum power is 1, let $I_{ext}$ be a random variable equal to the relative out-of-cell interference experienced by a user, distributed over all positions in the cell and over log-normal fading. The relative out-of-cell interference is defined to be the out-of-cell interference divided by the received power from the in-cell base-station. The survivor function $S(x):=Pr(I_{ext} \geq x)$ is shown in FIG. 7. For details on how this function may be calculated, see the above-cited reference A. J. Viterbi, "CDMA, Principles of Spread Spectrum Communication," Addison-Wesley, 1995. It is actually assumed that each base station has maximum transmit power 2, but only half of this power is dedicated to data. For simplicity, the in-cell interference is assumed to be equal to the in-cell received power. Let the target $E_b/I_0$ be 7 dB, and let the bandwidth of the system be 4 MHz. Then, using the formula $$\frac{E_b}{I_0} = \frac{\text{Bandwidth}}{\text{TransmitRate}} \text{Signal-Noise Ratio},$$

results in $$c_i = 2 \times \frac{10^{0.7}}{4 \times 10^6}(1 + I_{ext}).$$

Appendix B. Setting the Weights Using the Chernoff Bound

The well-known Chernoff bound for the tail probability of a random variable x is expressed as $$-\ln Pr[x>C] \geq Cs - F(s) \tag{9}$$

for $s \geq 0$, where $F(s)$ is the log-moment-generating-function of the random x, defined as $$F(s) = \ln E[e^{sx}]$$

with E[ ] denoting expected value. See, e.g., J. A. Bucklew, "Large Deviation Techniques in Decision, Simulation and Estimation," Wiley-Interscience, New York, 1990, which is incorporated by reference herein. In particular, the tightest value of this bound is obtained as $$-\ln Pr[x > C] \geq \max_s Cs - F(s). \tag{10}$$

Figure 8A:
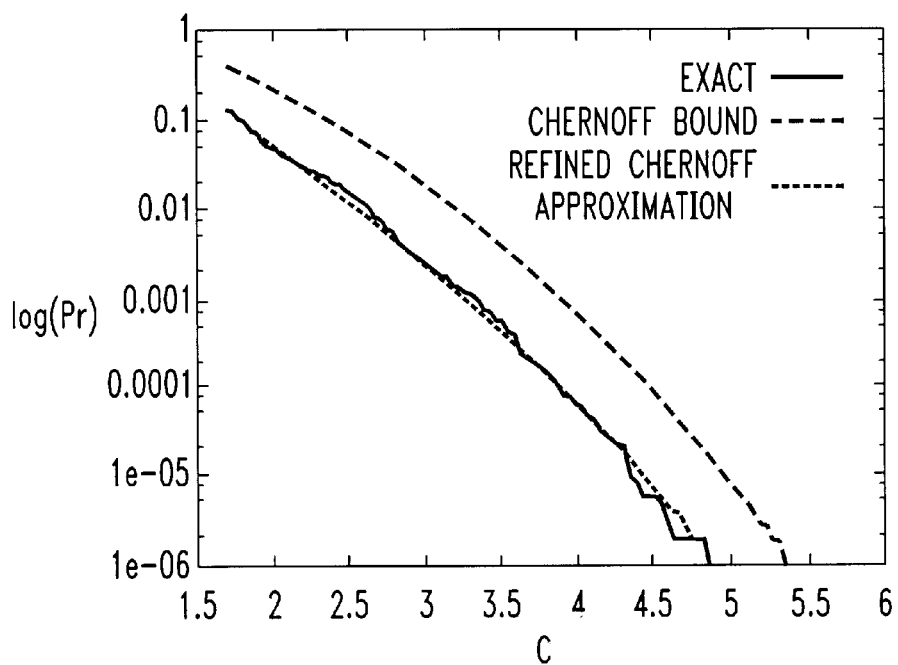
FIGS. 8A and 8B show plots of probability functions based on the Chernoff bound for different values of maximum summation index n.
Figure 8B:
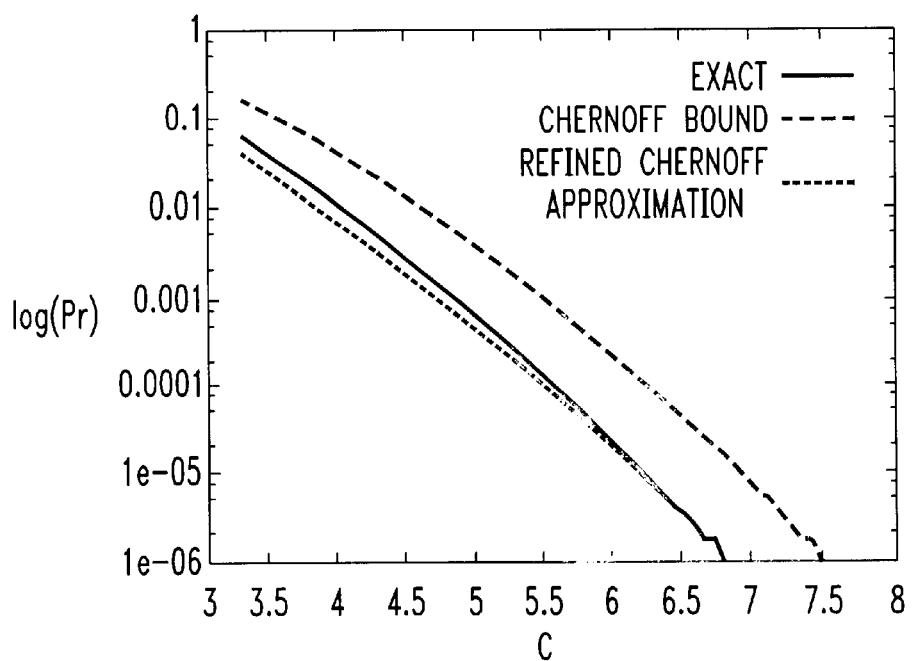

This expression may be refined, under the assumptions that the probabilities of interest are small and x is an aggregate of a sufficiently large number of random variables, to obtain the refined Chernoff approximation $$-\ln Pr[x > C] \geq Cs^* - F(s^*) + \ln\left[\sqrt{2\pi}\, s^* \sigma(s^*)\right] \tag{11}$$

$$\text{where } \sigma^2(s^*) = \frac{d^2 F(s)}{ds^2}\bigg|_{s=s^*} \equiv F''(s^*) \text{ and}$$

$$s^* = \arg\max_s Cs - F(s),$$

i.e., $s^*$ satisfies $C=F'(s^*)$. For illustration, FIGS. 8A and 8B show a comparison of exact tail probabilities with these approximations for the cases of weighted combinations of binary variables. More particularly, FIGS. 6A and 6B show $$Pr\left[\sum_{i=1}^n w_i x_i > C\right]$$

as a function of C for binary $x_i \in \{0, 1\}$ and fixed $w_i \in [0, 1]$, with $x_i=1$ with probability 0.1 for all i, for values of n=10 and n=20, respect Note that the refined Chernoff approximation provides an accurate estimate even with as few as 10 variables, while the Chernoff bound differs only by a constant factor.

These approximations are now applied to compute rate violation probabilities and set the weights. Recall Equation (6) that expresses the conditions to be satisfied by the weights $\phi_i$. This yields $$Pr[R_i < R_i] = Pr\left[\frac{\phi_i}{\phi_i + \sum_{j\neq 1} \phi_j \xi_j C_i} < R_i\right] \leq e^{-\delta_i}. \quad (12)$$

The Chernoff bound on Equation (12) is used to write the following sufficient condition after some algebraic manipulation:

$$s_i\phi_i\left(\frac{P}{C_iR_i} - 1\right) - \sum_{j\neq i} F_j(\phi_j s_i) \geq \delta_i, \quad (13)$$

where $s_i \geq 0$ are the so-called Chernoff parameters, and $F_j(s) = E[e^{s\xi_j}] = \ln[1-p_j+p_j e^s]$ is the log-moment-generating-functions of $\xi_j$, which is 1 with probability $p_j$. Equation (13) can be rewritten as $$\frac{s_i\phi_i\left(\frac{P}{C_iR_i} - 1\right) + F_i(\phi_i s_i) - \delta_i}{\sum_j F_j(\phi_j s_i)} \geq 1 \quad (14)$$

for each user i. This requires that the following optimization problem be solved to obtain $$A = \max_{\phi} \min_i \max_{s_i} \frac{s_i\phi_i\left(\frac{P}{C_iR_i} - 1\right) + F_i(\phi_i s_i) - \delta_i}{\sum_j F_j(\phi_j s_i)} \quad (15)$$

which then guarantees feasibility if $A \geq 1$, with weights set to the solution values $\phi_i^*$. Note that this is only a sufficient condition, and not necessary, on account of the Chernoff bound which is typically slack in the absence of sufficient aggregation.

However, Equation (15) poses a difficult problem for any realistic real-time applications, and is likely to require sophisticated optimization techniques. A simpler problem is obtainable through eliminating the Chernoff parameters by setting them to $s_i=1$ for all i. The resulting solution is further conservative, since it eliminates the step of maximizing over $s_i$. However, this yields the following more tractable problem:

$$B = \max_{\phi} \min_i \frac{\phi_i\left(\frac{P}{C_iR_i} - 1\right) + F_i(\phi_i) - \delta_i}{\sum_j F_j(\phi_j)} \quad (16)$$

It can be shown that the functions $$G_i \frac{\phi_i\left(\frac{P}{C_iR_i} - 1\right) + F_i(\phi_i) - \delta_i}{\sum_j F_j(\phi_j)} \quad (17)$$

are increasing functions of $\phi_i$ and decreasing functions of $\phi_j$:$j \neq i$. This implies that the solution that maximizes B satisfies $G_i = \Delta$ (a user independent constant) for all i. To obtain the optimum, one can then maximize over this single parameter $\Delta$. In summary, the problem set forth in Equation (15) is equivalent to $$B = \max_{\Delta} \frac{\Delta}{\sum_j F_j[\phi_j(\Delta)]} \quad (18)$$

where the functions $\phi_j(\Delta)$ are obtained by inverting $$\phi_j\left(\frac{P}{C_jR_j} - 1\right) + F_j(\phi_j) - \delta_i = \Delta. \quad (19)$$

For a small number of users, one may efficiently solve for B using bisection over $\Delta$, while solving for the $\phi_j(\Delta)$ by bisection at each stage. As before, if the solution $B^*$ exceeds unity, one obtains a sufficient condition for feasibility with the corresponding $\phi_i^*$. However, this condition is usually conservative due to the looseness of the regular Chernoff bound. It is therefore preferable, at this stage, to compute the rate violation probabilities using the refined Chernoff bound to perform admission control, i.e., verify the validity of the following condition for each user i:

$$s_i^*\phi_i^*\left(\frac{P}{C_iR_i} - 1\right) - \sum_{j\neq i} F_j(\phi_j^* s_i^*) + \frac{1}{2}\ln\left[2\pi\sum_{j\neq i}(s_i^*\phi_j^*)^2 F_j''(\phi_j^* s_i^*)\right] \geq \delta_i, \quad (20)$$

where $s_i^*$ satisfies $$\sum_{j\neq i} \phi_j^* F_j'(\phi_j^* s_j^*) = \phi_i^*\left(\frac{P}{C_iR_i} - 1\right). \quad (21)$$

The solution $\phi_i^*$ may be iteratively improved using the algorithm ITER given below. Hereafter, the refined Chernoff approximation is used for all probabilities. For later descriptional convenience, define the following functions denoting the ratios of the achieved probability exponent to the desired one:

$$G_i(\phi) = \quad (22)$$

$$\frac{1}{\delta_i}\left(s_i^*\phi_i\left(\frac{P}{C_iR_i} - 1\right) - \sum_{j\neq i} F_j(\phi_j s_i^*) + \frac{1}{2}\ln\left[2\pi\sum_{j\neq i}(s_i^*\phi_j)^2 F_j''(\phi_j s_i^*)\right]\right),$$

where, as before, the $s_i^*$ satisfy Equation (21) with the $\phi^*$ replaced by $\phi$.

Algorithm ITER
1. Begin with $\phi^{(0)(0)} = \phi^*$ computed as described above.
2. Determine the index k corresponding to the best served user, i.e, $$k = \arg\max_i G_i(\phi^{(n)}).$$

3. Update $\phi$ as $\phi^{(n+1)} = \phi^{(n)} + t^* e_k$, where $e_k$ is the basis vector with 1 in the kth entry and 0 in all others, and $t^*$ is defined as $$t^* = \arg\max_t \min_i G_i(\phi^{(n)} + te_k).$$

4. Stop when all the $G_i$ are equal. Feasibility is established if this value exceeds unity.

It can be shown that the $G_i$ are increasing functions of $\phi_i$ and decreasing functions of $\phi_j$, j=i. As a result, the above algorithm is guaranteed to increase the value of the smallest $G_i$ at each stage, and involves a series of one-dimensional optimizations that are guaranteed to converge when all the $G_i$ are equal.

Appendix C. Queuing Analysis for Determining the Rate Allocation

C.1 Arrivals During a Service

In the following, a Markov chain of customers left behind in queue following each departure is constructed. The arrivals process is not Markov since the total number of arrivals depends on whether the state of the source is on or off at the commencement of service. However, if the on/off state following each departure is included then the arrival process is Markov. What is of interest is therefore the number of arrivals during a service in which the state of the source at the beginning and the end of the service period are given.

One case will be described in detail, the derivation of the other three cases being similar. Suppose that the state of the source is on at the start of service and that the state at the end is off. Suppose further that there are $r \geq 1$ active periods. The quantity of interest is the probability density of Y the total amount of on time and that the sources are in the given states at the start and end of the period.

The sum of r on periods is gamma with r degrees of freedom with scale parameter $\alpha$. There are r−1 corresponding off periods with cumulative time V and a final rth off period with duration Z such that Y+V<1 and Y+V+Z≧1. The goal is to derive the (improper) density of Y. The probability that $y \leq Y \leq y+dy$, $y<1$ is $$g_{10}^r(y)dy = \frac{\alpha^r y^{r-1}}{(r-1)!}e^{-\alpha y} \times \int_{v=0}^{1-y} \frac{\beta^{r-1} v^{r-2}}{(r-2)!} e^{-\beta v}e^{-\beta(1-y-v)}dvdy \quad (23)$$

$$= \alpha^r \beta^{r-1} \frac{y^{r-1}(1-y)^{r-1}}{(r-1)!^2} e^{(\beta-\alpha)y-\beta}dy$$

this holds for $r \geq 2$ active periods. If there is Just one active period, $$g_{10}^1(y)dy = \alpha e^{-\alpha y}e^{-\beta(1-y)}. \quad (24)$$

Summing over r results in the overall density as $$g_{10}(y) = \alpha e^{-\beta}e^{(\beta-\alpha)y}I_0(2\sqrt{\alpha\beta y(1-y)}). \quad (25)$$

Consider next the case where the source is in the off state at the start of service and in the on state at the end with r periods in which the source is off. Thus the cumulative off time has $\beta$ density with r degrees of freedom. The total active time is therefore 1−V. Thus the probability that $v \leq V < v+dv$, $v<1$ may be written as $$g_{01}^r(v)dv = \frac{\beta^r v^{r-1}}{(r-1)!}e^{-\beta v} \times \int_{w=0}^{1-v} \frac{\alpha^{r-1} w^{r-2}}{(r-2)!} e^{-\alpha w}e^{-\alpha(1-v-w)}dwdv. \quad (26)$$

$$= \beta^r \alpha^{r-1} \frac{v^{r-1}(1-v)^{r-1}}{(r-2)!^2} e^{(\alpha-\beta)v-\alpha}dv$$

This holds for $r \geq 2$ active periods. One may now substitute y=1−v to obtain the corresponding density for Y as $$g_{01}^r(y)dy = \beta^r \alpha^{r-1} \frac{y^{r-1}(1-y)^{r-1}}{(r-1)!^2} e^{(\beta-\alpha)y-\beta}dy. \quad (27)$$

If there is just one active period, $$g_{01}^1 = \beta e^{(\beta-\alpha)y-\beta}. \quad (28)$$

Summing over r yields $$g_{01}(y)dy = \beta e^{(\beta-\alpha)y}e^{-\beta}I_0(2\sqrt{\alpha\beta y(1-y)}). \quad (29)$$

Consider now the case where the source is on at both the start and the end of service. Suppose there are $r \geq 1$ off periods and the same number of on periods with an additional final on period. This yields $$g_{11}^r(v)dv = \frac{\beta^r v^{r-1}}{(r-1)!}e^{-\beta v} \times \int_{w=0}^{1-v} \frac{\alpha^r w^{r-1}}{(r-1)!} e^{-\alpha w}e^{-\alpha(1-v-w)}dwdv \quad (30)$$

$$= \beta^r \alpha^r \frac{v^r(1-v)^r}{(r-1)!r!} e^{(\alpha-\beta)v-\alpha}dv$$

As before, substitute y=1−v to obtain $$g_{11}^r(y)dy = \beta^r \alpha^r \frac{(1-y)^{r-1}y^r}{(r-1)!r!} e^{(\beta-\alpha)y-\beta}dy. \quad (31)$$

If the source is on the entire period, $$g_{11}^1(y)dy = e^{-\alpha}\delta(y-1)dy. \quad (32)$$

Summing over r yields $$g_{11}(y)dy = \quad (33)$$

$$\alpha\beta e^{(\beta-\alpha)y}e^{-\beta}\sqrt{\frac{y}{\alpha\beta(1-y)}}I_1(2\sqrt{\alpha\beta y(1-y)})dy + e^{-\alpha}\delta(y-1)dy.$$

The final case is when the source is in the off state at the start and end of service. Suppose there are $r \geq 1$ active periods. This yields $$g_{00}^r(y)dy = \frac{\alpha^r y^{r-1}}{(r-1)!}e^{-\alpha y} \times \int_{v=0}^{1-y} \frac{\beta^r v^{r-1}}{(r-1)!} e^{-\beta v}e^{-\beta(1-y-v)}dvdy \quad (34)$$

$$= \alpha^r \beta^r \frac{y^{r-1}(1-y)^r}{(r-1)!r!} e^{(\beta-\alpha)y-\beta}dy$$

If there is no active period, $$g_{00}^0(y)dy = e^{-\beta}\delta(y)dy. \quad (35)$$

Summing over r yields $$g_{00}(y)dy = \quad (36)$$

$$\alpha\beta e^{(\beta-\alpha)y}e^{-\beta}\sqrt{\frac{(1-y)}{\alpha\beta}}I_1(2\sqrt{\alpha\beta y(1-y)})dy + e^{-\beta}\delta(y)dy.$$

From the four densities given above, one may obtain the generating functions for the number of arrivals which take place during a service period, $$F_{01}(z) = \int_0^1 g_{01}(y)e^{-y\lambda(1-z)}dy$$

$$= \int_0^1 \beta e^{(\beta-\alpha)y}e^{-\beta}I_0(2\sqrt{\alpha\beta y(1-y)})e^{-y\lambda(1-z)}dy,$$

$$F_{10}(z) = \int_0^1 g_{10}(y)e^{-y\lambda(1-z)}dy$$

$$= \int_0^1 \alpha e^{\beta}e^{(\beta-\alpha)y}I_0(2\sqrt{\alpha\beta y(1-y)})e^{-y\lambda(1-z)}dy,$$

$$F_{11}(z) = \int_0^1 g_{11}(y)e^{-y\lambda(1-z)}dy,$$

$$= \int_0^1 \alpha\beta e^{(\beta-\alpha)y}e^{-\beta}\sqrt{\frac{2y}{\alpha\beta(1-y)}}I_1(2\sqrt{\alpha\beta y(1-y)})e^{-y\lambda(1-z)}dy + e^{-\alpha-\lambda(1-z)},$$

$$F_{00}(z) = \int_0^1 g_{00}(y)e^{-y\lambda(1-z)}dy$$

$$= \alpha\beta\int_0^1 e^{(\beta-\alpha)y}e^{-\beta}\sqrt{\frac{2(1-y)}{\alpha\beta y}}I_1(2\sqrt{\alpha\beta y(1-y)})e^{-y\lambda(1-z)}dy + e^{-\beta}$$

C.2 Stationary Probabilities for the Number in Queue on Departure

Let $p_j^0(n)$ be the probability that the nth customer departs to leave j customers in queue and the source in the off state. Also let $p_j^1(n)$ be similarly defined. The limiting stationary values of these probabilities are of interest.

Begin with the forward recurrence equations for these probabilities. Using the theorem of total probabilities, $$p_j^0(n+1) = \sum_{k=1}^{j+1} p_k^0(n)f_{j+1-k}^{00} + \sum_{k=1}^{j+1} p_k^1(n)f_{j+1-k}^{10} + p_0(n)f_j^{10} \tag{37}$$

$$p_j^1(n+1) = \sum_{k=1}^{j+1} p_k^0(n)f_{j+1-k}^{01} + \sum_{k=1}^{j+1} p_k^1(n)f_{j+1-k}^{11} + p_0(n)f_j^{11}.$$

Define the transform of $p_j^i(n)$, i=0, 1 as $$Q_n^i(z) = \sum_{j=0}^{\infty} p_j^i(n)z^j, i = 0, 1. \tag{38}$$

One may thus take the transform of the left hand side of (38) to obtain $$Q_{n+1}^0(z) = \sum_{j=0}^{\infty}\sum_{k=1}^{j+1} p_k^0(n)f_{j+1-k}^{00}z^j + \sum_{j=0}^{\infty}\sum_{k=1}^{j+1} p_k^1(n)f_{j+1-k}^{10}z^j + \sum_{j=0}^{\infty} p_0(n)f_j^{10}z^j \tag{39}$$

$$= z^{-1}\sum_{k=1}^{\infty} z^k p_k^0(n)\sum_{j=k-1}^{\infty} f_{j+1-k}^{00}z^{j+1-k} +$$

$$z^{-1}\sum_{k=1}^{\infty} p_k^1(n)z^k \sum_{j=k-1}^{\infty} f_{j+1-k}^{11}z^{j+1-k} + p_0(n)\sum_{j=0}^{\infty} f_j^{10}z^j$$

$$= z^{-1}F^{00}(z)[Q_n^0(z) - p_0^0(n)] + z^{-1}F^{10}(z)[Q_n^1(z) - p_0^1(n)] + p_0(n)F^{10}(z)$$

Repeating this calculation yields $$Q_{n+1}^1(z) = z^{-1}F^{01}(z)[Q_n^0(z) - p_0^0(n)] + z^{-1}F^{11}(z)[Q_n^1(z) - p_1^0(n)] + p_0(n)F^{11}(z) \tag{40}$$

For the moment assume that a stationary distribution exists, $Q^i(z)$, i 0, 1, in which case the following must be satisfied, $$Q^0(z)(F^{00}(z)-z) + Q^1(z)F^{10}(z) = p_0^0 F^{00}(z) + p_0^1 F^{10} - p_0 z F^{10}(z) \tag{41}$$

$$Q^0(z)F^{01}(z) + Q^1(z)(F^{11}(z)-z) = p_0^0 F^{01}(z) + p_0^1 F^{11}(z) - p_0 z F^{11}(z) \tag{42}$$

The above equations are linear in Q and can be solved using Cramer's rule, $$Q^0(z) = \frac{A(z)}{\xi(z)} \tag{43}$$

$$Q^1(z) = \frac{B(z)}{\xi(z)}$$

where $\xi$, A, B are $$\xi(z) = \begin{vmatrix} F^{00}(z) - z & F^{10}(z) \\ F^{01}(z) & F^{11}(z) - z \end{vmatrix} \tag{44}$$

$$A(z) = \begin{vmatrix} p_0^0 F^{00}(z) + p_0^1 F^{10} - p_0 z F^{10}(z) & F^{10}(z) \\ p_0^1 F^{11}(z) + p_0^0 F^{01}(z) - p_0 z F^{11}(z) & F^{11}(z) - z \end{vmatrix}$$

$$B(z) = \begin{vmatrix} F^{00}(z) - z & p_0^0 F^{00}(z) + p_0^1 F^{10} - p_0 z F^{10}(z) \\ F^{01}(z) & p_0^1 F^{11}(z) + p_0^0 F^{01}(z) - p_0 z F^{11}(z) \end{vmatrix},$$

Note that the left hand sides are well defined for complex $z, |z| \leq 1$ and are analytic in that region. It follows that any root of the determinant, $\xi(z)$ must also be a root of the numerators A(z), B(z).

Let d(z) be such a root. It will now be demonstrated that the determinant has a real root, z, z, $\in$ (−1, 1).

Define the matrix F(z) to be $$F(z) = \begin{pmatrix} F^{00}(z) & F^{10}(z) \\ F^{01}(z) & F^{11}(z) \end{pmatrix}. \tag{45}$$

For $z \in [0, 1]$ this matrix has a Perron eigenvector lying in the interval [0, 1]. Note that the Perron eigenvector $v_r(1) = 1$ at $z=1$ because F(1) is a probability matrix and hence $\xi(1)$ is 0. Observe that $\xi(z)$ is continuous and differentiable in [−1,1]. It will be shown that $\xi(-1) > 0$. If it then be shown that $\xi'(1) > 0$ it will follow that $\xi$ has a root in (−1,1) since $\xi$ is continuous. That this latter derivative is positive will follow from the stability criterion for the queue.

Observe that $$\xi(-1) = |F(-1) + I|, \tag{46}$$

and also that $F(-1)+I$ is a diagonally dominant (i.e., Hadamard) matrix. To see this note that $$1-|F^{00}(-1)|-|F^{01}(-1)|\geq 1-F^{00}(1)-F^{01}(1)=0 \quad (47)$$

with a similar inequality for the second row. The dominance is strict unless $F^{00}$ has only odd powers and $F^{01}$ has only even powers, etc. However, diagonally dominant matrices have nonnegative determinants and strictly diagonally dominant matrices have positive determinants, and so $\xi(-1)\geq 0$ with strict inequality except in the special case mentioned above.

Denote $F^{00}(1)=F^{00}$ etc. and use a similar convention for derivatives. Differentiating $\xi(z)$ at 1 yields $$\xi'(1)=2-F^{00}-F^{11}-F^{00'}(1-F^{11})-F^{11'}(1-F^{00})$$

$$-F^{01'}F^{10}-F^{10'}F^{01}. \quad (48)$$

The condition for stability is that the mean number of arrivals during a unit interval be smaller than 1, i.e., $$q_0 F^{00'}+q_0 F^{01'}+q_1 F^{10'}+q_1 F^{11'}=\gamma<1 \quad (49)$$

where $q_i$ are the equilibrium probabilities that the source is in state i at the commencement of a service. They satisfy $$q_0 F^{00}+q_1 F^{10}=q_0 \quad (50)$$

$$q_0 F^{01}+q_1 F^{11}=q_1$$

$$q_0+q_1=1 \quad (51)$$

from which one can obtain that $$q_0(2-F^{00}-F^{11})=F^{10}=1-F^{11}$$

$$q_1(2-F^{00}-F^{11})=F^{01}=1-F^{00} \quad (52)$$

Substituting yields $$\xi'(1)=(2-F^{00}-F^{11})(1-\gamma)>0 \quad (53)$$

It follows that $\xi(z)$ in $[-1,1]$ has a small and positive root.

The determination of the unknown probabilities $p_0^0$, $p_0^1$ will now be described. Let $\sigma$ denote a zero of $\xi$ in $[-1, 1]$ since $Q_0$, $Q_1$ are analytic in this interval it follows that a root of the denominator must also be root of the numerator. One thus has that $$A(\sigma)=B(\sigma)=0. \quad (54)$$

However, it is easy to see that if $\xi(\sigma)=0$ then $A(\sigma)=0$ and $B(\sigma)=0$ imply the same condition on $p_0^0$, $p_0^1$. To see this note that the two conditions $A(\sigma)=B(\sigma)=0$ require $$\frac{p_0^0 F^{00}(\sigma)+p_0^1 F^{10}(\sigma)-p_0 F^{10}(\sigma)}{p_1^1 F^{11}(\sigma)+p_0^1 F^{11}(\sigma)-p_0 \sigma F^{11}(\sigma)}=\frac{F^{01}(\sigma)}{F^{00}(\sigma)-\sigma}=\frac{F^{11}(\sigma)-\sigma}{F^{10}(\sigma)}. \quad (55)$$

The equality of the two right hand terms is equivalent to $\xi(\sigma)=0$, and thus there is only one non-trivial condition arising from a zero in $\xi(\sigma)$, which is $$(p_0^0 F^{00}(\sigma)+p_0^1 F^{10}(\sigma)-p_0 \sigma F^{10}(\sigma))(F^{11}(\sigma)-\sigma)= \quad (56)$$

$$F^{10}(\sigma)(p_0^1 F^{11}(\sigma)+p_0^0 F^{01}(\sigma)-p_0 \sigma F^{11}(\sigma)).$$

One may also obtain an inhomogeneous linear equation as follows. Observe that the generating function for the number of customers left on departure is $Q(z)=Q_0(z)+Q_1(z)$ so that $Q(1)=1$ since Q is a probability generating function. It is known that $\xi$ has a root at 1 so that $$\lim z \to 1^{-} Q(z) = \frac{A(z)+B(z)}{\xi(z)} = 1. \quad (57)$$

Applying L'Hopital's rule it can be seen that $$A'(1)+B'(1)=\xi'(1). \quad (58)$$

These two equations enable the unknown quantities $p_0^0$, $p_0^1$ to be determined and thus also the generating functions given in Equation (44). As explained previously, these can be numerically inverted to yield the tail of departure queue distribution which provides a bound on the tail of the sojourn time distribution. This forms the basis for rate determination.

What is claimed is:

1. A method of processing user quality of service requirements for forward link data transmission in a wireless communication system, the method comprising the steps of:

converting the quality of service requirements for each of at least a subset of the users into a rate and corresponding violation probability; and dividing an available system resource among the users in accordance with the rates determined for those users.

2. The method of claim 1 wherein the wireless communication system comprises a CDMA system.

3. The method of claim 1 wherein the converting and dividing steps are implemented in a base station of the system.

4. The method of claim 1 wherein the converting step generates for each user i a rate $R_i$ to be provided for user i with a probability $1-e^{-\delta_i}$, where the $\delta_i$ are determined independently for each of the users.

5. The method of claim 1 wherein the available system resource is a total power P and the power is divided among the users in a manner which satisfies $$\sum_i P_i = \sum_i c_i R_i \leq P$$

where $P_i$ denotes the power allocated to user i, $c_i$ denotes a cost factor associated with user i, and $R_i$ denotes the rate of user i.

6. The method of claim 1 wherein the available system resource is a total power P and the power is divided among the users in accordance with a proportional sharing equation $$P_i = \frac{\phi_i}{\sum_{j \, active} \phi_j} P,$$

where $P_i$ denotes the power allocated to user i, and $\phi_i$ denotes a weight associated with user i and corresponding to a minimum power assignment that would guarantee the rate associated with the user i.

7. The method of claim 1 wherein the available system resource is a total power P and the power is divided among the users so as to satisfy $$Pr\left[\frac{\phi_i}{\sum_j x_j \phi_j} \frac{P}{c_i} \leq R_i\right] \leq e^{-\delta_i}$$

where Pr[ ] denotes the probability of an expression within the brackets, $\phi_i$ denotes a weight associated with user i, $R_i$ denotes a rate associated with user i, $\delta_i$ is a tail probability associated with user i, $c_i$ is a cost factor associated with user i, and $x_j$ is an instantaneous binary activity indicator random variable of user j that determines an instantaneous power assignment for all active users.

8. The method of claim 7 wherein $\delta_i$ is selected as a constant $\delta$ which is much larger than unity, a set of activity factors $\alpha_i$ associated with user i is much larger than $e^{-\delta}$, and the $\phi_i$ are selected as $c_i R_i$.

9. The method of claim 1 wherein the available system resource is divided among the users such that each user receives a portion of the resource which is held fixed within designated scheduling intervals.

10. The method of claim 1 wherein multiplexing gain is provided for multiple bursty users by generating a characterization of the forward link data transmission activity $\alpha_i$ of each user i, wherein $\alpha_i$ denotes the fraction of time the user i actually uses its assigned portion of the system resource, and is a function of the rate $R_i$ of the user i which is selected to be between a peak rate and a mean data rate for the user i.

11. The method of claim 1 wherein a queuing model is used to determine a minimum rate $R_i$ that would meet the quality of service requirement of user i with a designated high target probability.

12. The method of claim 1 wherein a queuing model is used to determine an activity factor $\alpha_i$ which is a function of a rate $R_i$ selected to meet the quality of service requirement of user i with a designated high target probability.

13. The method of claim 1 wherein a plurality of rates are predetermined for a set of expected user classes, and the rates for the users are selected from the plurality of predetermined rates.

14. The method of claim 1 wherein an exact computation or a Chernoff bound approximation is utilized to determine rate violation probabilities for each of the users.

15. The method of claim 1 further including the step of implementing an admission control function which ensures that a given one of the users is admitted to utilize a portion of the available system resource only if its corresponding rate violation probability meets one or more established criteria.

16. An apparatus for processing user quality of service requirements for forward link data transmission in a wireless communication system, the apparatus comprising:

a base station having at least one processing device associated therewith, the at least one device being operative to convert the quality of service requirements for each of at least a subset of the users into a rate and corresponding violation probability, and to divide an available system resource among the users in accordance with the rates determined for those users.

17. A machine-readable storage medium for storing one or more programs for use in processing user quality of service requirements for forward link data transmission in a wireless communication system, wherein the one or more programs when executed implement the steps of:

converting the quality of service requirements for each of at least a subset of the users into a rate and corresponding violation probability; and dividing an available system resource among the users in accordance with the rates determined for those users.

* * * * *